(12) United States Patent
Emam et al.

(10) Patent No.: US 8,108,783 B2
(45) Date of Patent: Jan. 31, 2012

(54) SYSTEM AND METHOD OF GUI OVERLAYING FOR MIGRATING FROM A FIRST APPLICATION TO A SECOND APPLICATION

(75) Inventors: Ossama Emam, Giza (EG); Genady Grabarnik, Scarsdale, NY (US); Dimitri Kanevski, Ossining, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 12/123,505

(22) Filed: May 20, 2008

(65) Prior Publication Data
US 2009/0293004 A1 Nov. 26, 2009

(51) Int. Cl.
*G06F 3/00* (2006.01)
(52) U.S. Cl. ........ 715/762; 715/705; 715/707; 715/708; 715/790
(58) Field of Classification Search .......... 715/705–715, 715/746, 762, 790; 707/999.102, 999.204
See application file for complete search history.

(56) References Cited

U.S. PATENT DOCUMENTS

| | | | |
|---|---|---|---|
| 5,179,700 A | 1/1993 | Aihara et al. | |
| 6,121,968 A * | 9/2000 | Arcuri et al. | 715/825 |
| 6,133,917 A * | 10/2000 | Feigner et al. | 715/708 |
| 6,505,208 B1 | 1/2003 | Kanevsky et al. | |
| 7,096,432 B2 * | 8/2006 | Huapaya et al. | 715/863 |
| 2004/0027383 A1* | 2/2004 | Jaeger | 345/769 |
| 2005/0203975 A1 | 9/2005 | Jindal et al. | |
| 2007/0061722 A1 | 3/2007 | Kronlund et al. | |
| 2007/0157103 A1 | 7/2007 | Arneson et al. | |
| 2008/0148150 A1* | 6/2008 | Mall | 715/707 |

* cited by examiner

*Primary Examiner* — Kieu Vu
*Assistant Examiner* — James T Durkin
(74) *Attorney, Agent, or Firm* — Schmeiser, Olsen & Watts; Joseph Bracken

(57) ABSTRACT

A system and associated method for migrating from a first application to a second application where the second application is an alternative to the first application with respect to functionality. Overlaying a first graphical user interface (GUI) onto the second application where the first GUI corresponding to the first application. Sending to a display device a set of steps which if executed would invoke a feature utilizing a second GUI after the feature was invoked utilizing the first GUI. Removing the first GUI with respect to the feature and displaying the second GUI with respect to the feature after satisfying a condition. Finally, repeating the steps of sending to a display device and removing the first GUI for all features common to both the first application and the second application.

20 Claims, 8 Drawing Sheets

SYSTEM AND METHOD OF GUI OVERLAYING FOR MIGRATING FROM A FIRST APPLICATION TO A SECOND APPLICATION

FIELD OF THE INVENTION

The present invention generally relates to graphical user interfaces (GUI). More specifically, the present invention discloses a system and a method for migrating from a first application corresponding to a first graphical user interface to a second application corresponding to a first graphical user interface, the second application being an alternative to the first application with respect to functionality.

BACKGROUND OF THE INVENTION

Traditionally, alternative applications comprise similar features and learning how to use such applications or a new version of an existing application is both time-consuming and results in low productivity. The low productivity and time consumption are a result of an end user's unfamiliarity with the alternative application's graphical user interface (GUI). For example, while there exist many types of word processor applications (e.g. Microsoft Word, Lotus Notes, Open Office Writer, etc.), the end user may feel more comfortable with some word processor applications and uncomfortable with others. Therefore, there is a need for the user to be able to switch between the different applications. However, switching between the different applications often proves difficult because of different user interfaces.

SUMMARY OF THE INVENTION

In view of the foregoing and other exemplary problems, drawbacks, and disadvantages of the conventional systems and methods, the present invention provides a method for migrating from a first application to a second application wherein the second application is an alternative to the first application with respect to functionality, the method comprising:

overlaying a first graphical user interface (GUI) onto the second application, the first GUI corresponding to the first application;

sending to a display device when a feature of the second application is invoked utilizing the first GUI a set of steps which if executed would invoke the feature utilizing a second GUI, the second GUI corresponding to the second application, the feature being common to both the first application and the second application;

removing after having satisfied a condition pertaining to the feature the first GUI with respect to the feature wherein the second GUI is exposed with respect to the feature; and repeating said sending and said removing for all features common to both the first application and the second application.

The present invention thus allows the user to use the features of the first interface with which he is familiar while learning progressively the features of the second interface.

DETAILED DESCRIPTION OF THE DRAWINGS

Although certain embodiments of the present invention are described herein, it is understood modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
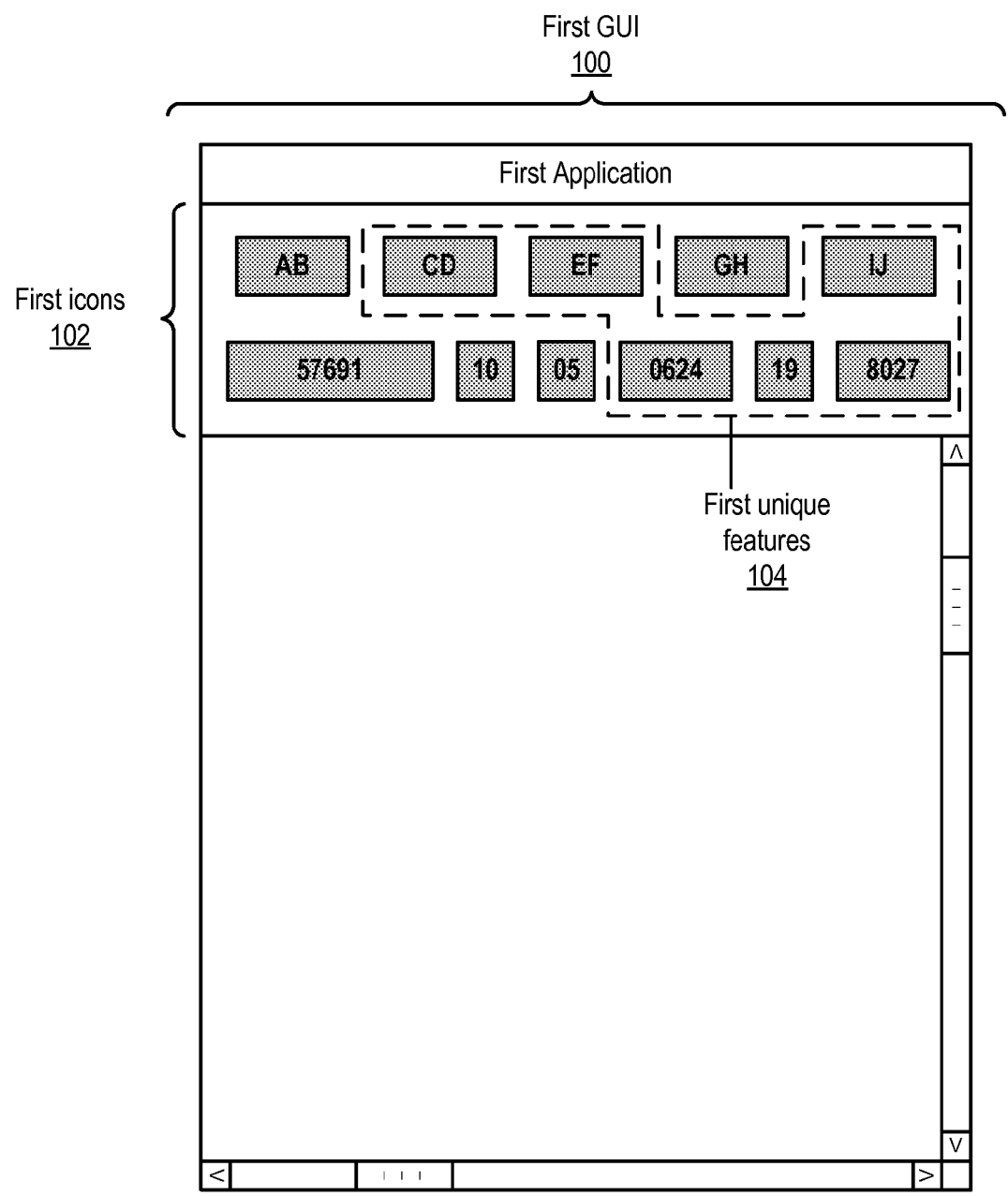
FIG. 1 illustrates a first graphical user interface (GUI), in accordance with the embodiments of the present invention.

FIG. 1 illustrates a first graphical user interface (GUI) 100, in accordance with the embodiments of the present invention. The first GUI 100 comprises first icons 102 representing features of the first application which an end user may invoke. The term application hereinafter means a piece of software designed to perform a specific task (e.g. document processing, photograph manipulation, etc.). The term feature hereinafter means a subroutine of the application which performs a calculation with variables provided by the application and supplies the application with a result (e.g. copy, cut, paste, save, open, etc.). A subset of the first icons 102, identified as the first unique features 104, are features specific to the first application only.

Figure 2:
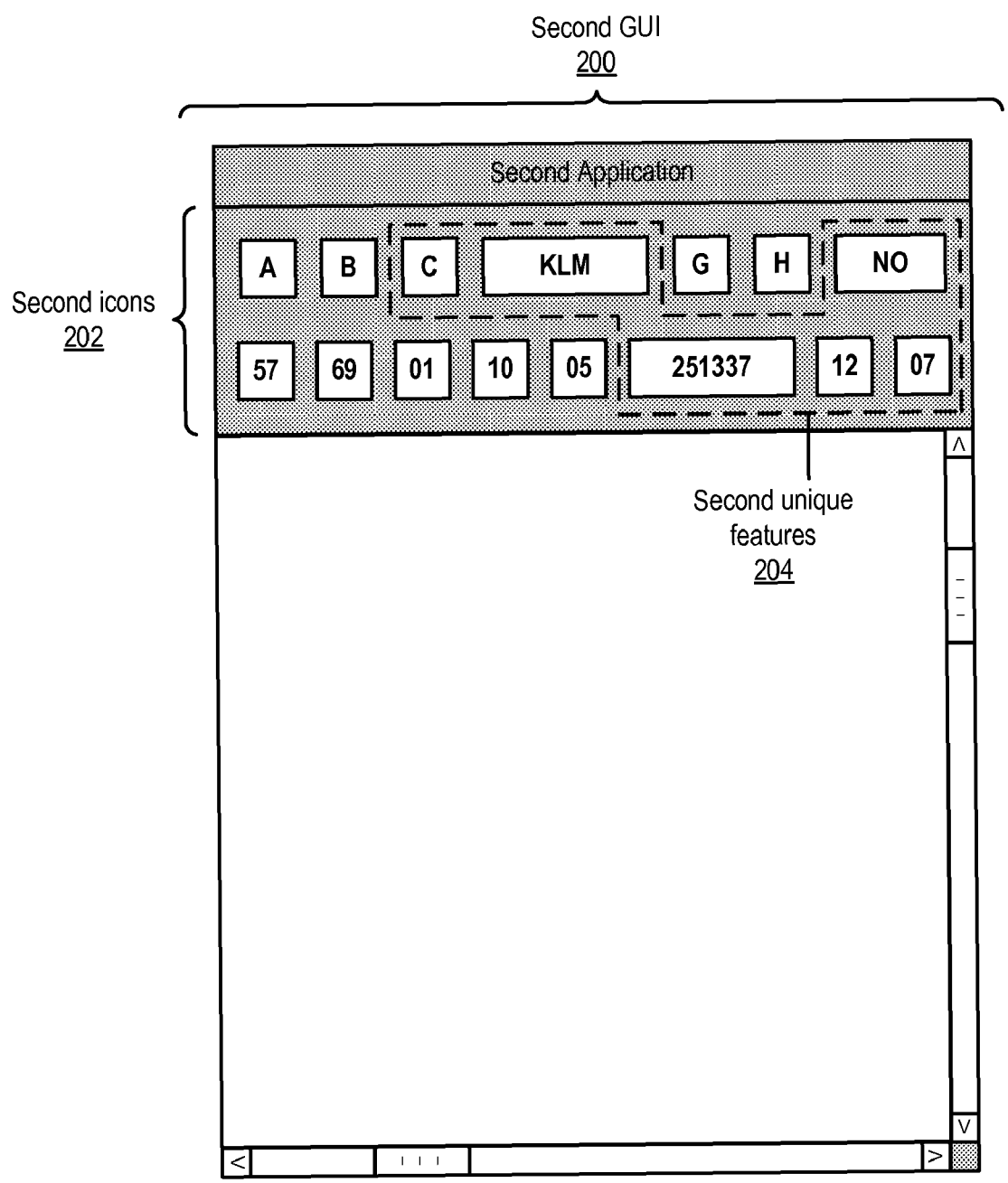
FIG. 2 illustrates a second GUI, in accordance with the embodiments of the present invention.

FIG. 2 illustrates a second GUI 200, in accordance with the embodiments of the present invention. The second GUI 200 comprises second icons 202 representing features of the second application which an end user may invoke. A subset of the second icons 202, identified as the second unique features 204, are features specific to the second application only.

Figure 3:
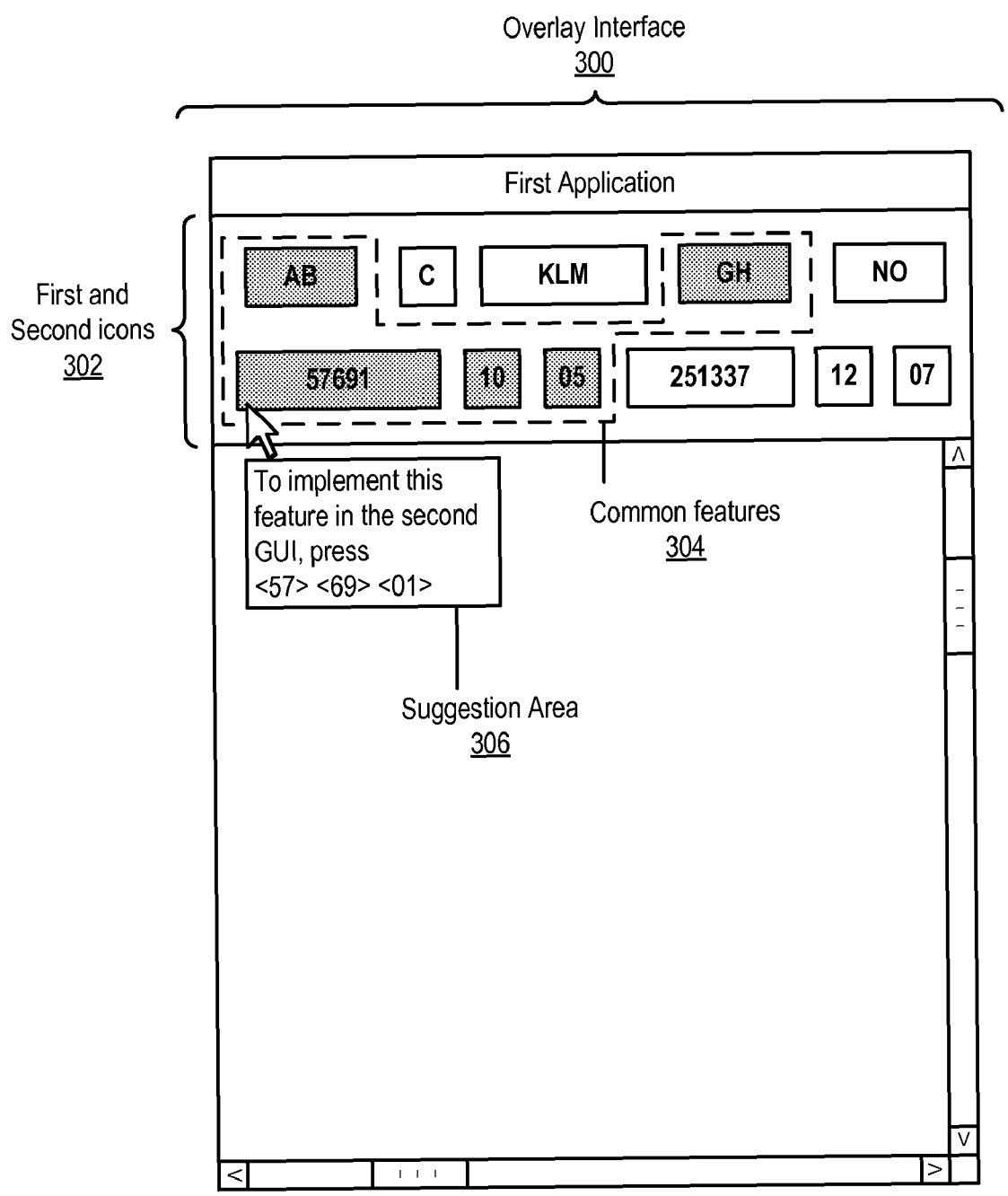
FIG. 3 illustrates an overlay interface comprising the first GUI overlaid second application, in accordance with the embodiments of the present invention.

FIG. 3 illustrates an overlay interface 300 corresponding to the first GUI 100 overlaid onto the second application, in accordance with the embodiments of the present invention. The overlay interface 300 comprises first and second icons 302 representing features of the second application which an end user may invoke. A subset of the first and second icons 302, identified as common features 304, are features which both the first application and the second application contain. The common features 304 are displayed according to the first GUI 100 since the end user is more familiar with the first GUI 100 than the second GUI 200. The first unique features 104 are suppressed from the overlay interface 300 since the first unique features correspond to features which the end use may not invoke in the second application. The second unique features 204 are not suppressed from the overlay interface 300 since the second unique features 204 are features which the end user may invoke in the second application.

According to an embodiment of the invention, the first application and the second application may have a same general function, but offer different unique features in view of this general function. For example Adobe® Photoshop® and Microsoft® Photo Editor applications both allow to edit and manage photos, but each offers unique features for editing and managing photos. The overlay interface 300 may then be adapted to the needs of the end user in terms of functionalities and usability, with respect to these similar applications. As a result, the overlay interface 300 makes it possible for the end user to use the more familiar application, for example Adobe® Photoshop®, while having at his disposal the additional features of the other similar application, for example Microsoft® Photo Editor.

The overlay interface 300 further comprises a suggestion area 306 designating a set of steps to be executed by the user, which if executed would invoke a feature utilizing the second GUI 200. The suggestion area 306 appears only when an end user invokes a feature from the set of common features 304.

The invention also has advantages for migrating an old version of an application to a new version of the same application. While an end user is familiar with the old version of the application, the end user may use the invention when the newer version of the application becomes available so that he can continue to execute functions in the interface of the older version while having in the same GUI the possibility to execute the features related to the old version, and new features or improved similar features related to the new version.

Figure 4:
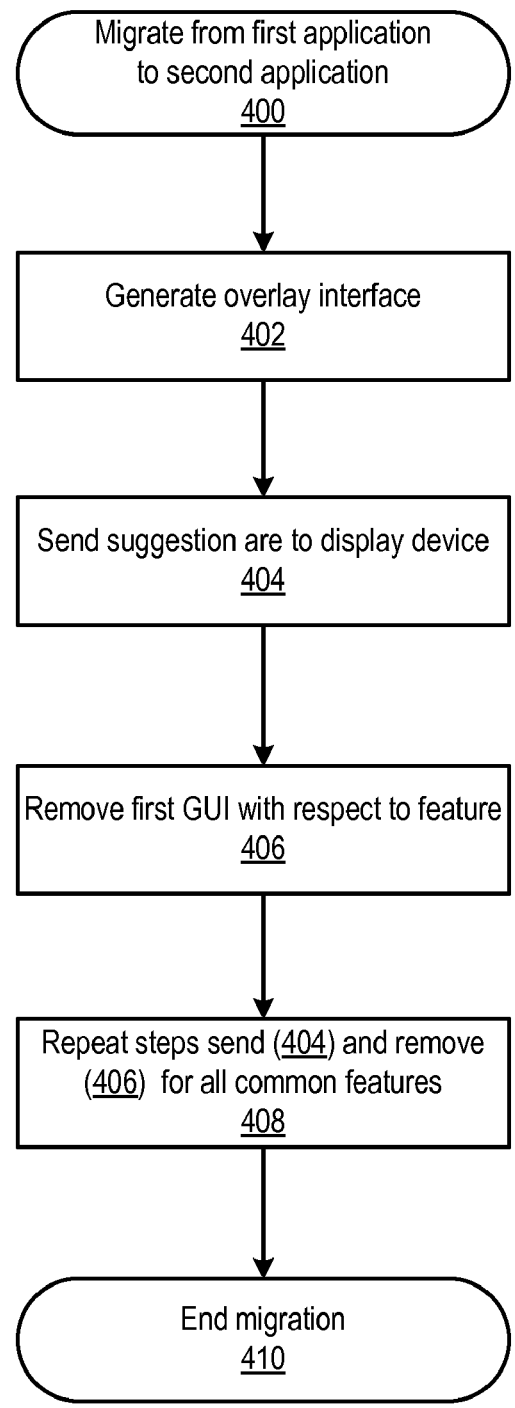
FIG. 4 illustrates a method for migrating from a first application to a second application wherein the second application is an alternative to the first application with respect to functionality, in accordance with the embodiments of the present invention.

FIG. 4 illustrates a method 400 for migrating from a first application to a second application wherein the second application is an alternative to the first application with respect to functionality, in accordance with the embodiments of the present invention.

The method 400 begins with step 402 which generates an initial display of the overlay interface 300 where the first GUI 100 is overlaid onto the second application. Step 402 traditionally occurs in response to an end user utilizing the present invention to migrate from the first application to the second application.

In one embodiment of the present invention, the first unique features 104 are suppressed from the first GUI 100. In an alternative embodiment of the present invention, the second unique features 204 are not suppressed from the first GUI 100. After completion of step 402, the method 400 continues with step 404 which generates a suggestion area 306 on the display device.

Step 404 sends a suggestion area 306 (see FIG. 3, supra) to the display device when a feature selected from the common features 304 is invoked utilizing the first GUI 100. Step 404 is invoked by the method 400 in response to an end user invoking one of the common features 304 displayed on the display device by the overlay interface 300. The suggestion area 306 indicates a set of steps which if executed would invoke the feature utilizing the second GUI 200. The suggestion area 306 thus can be seen as teaching an end user how to invoke the feature invoked in the second GUI 200. After completion of step 404, the method 400 continues with step 406 which removes the first GUI 100 with respect to the feature invoked.

Step 406 removes the first GUI 100 with respect to the feature invoked after a condition is satisfied. Step 406 is invoked by the method 400 in response to the satisfaction of a condition set by the end user.

In one embodiment of the present invention, the condition is a number of times the feature (from the common features 304) of the second application has been invoked utilizing the first GUI 100. For example, the condition may be satisfied after the feature has been invoked twenty five (25) times. Note each time the feature from the common features 304 was invoked, the suggestion area 306 displays the steps necessary to invoke the feature utilizing the second GUI 200.

In another embodiment of the present invention, the condition is an amount of time since the feature (from the common features 304) of the second application was first invoked utilizing the first GUI 100. For example, the condition may be satisfied ten (10) days after the feature was first invoked utilizing the first GUI 100. Note, each time the feature from the common features 304 was invoked, the suggestion area 306 displays the steps necessary to invoke the feature utilizing the second GUI 200.

After completion of step 406, the method 400 continues with step 408 which repeats steps send 404 and remove 406 for all common features 304.

Step 408 repeats steps 404 and 406 for all common features 304. In one embodiment of the present invention, step 408 may contain a second condition which measures the time since the last invocation of step 406. If after a predetermined period of time elapsed since the last invocation of step 406, the first GUI 100 is removed completely exposing the second GUI 200. The second condition would take into account those common features 304 which an end user does not use and therefore no longer need to display the first GUI 100 with respect to.

In an alternative embodiment of the present invention, step 408 may contain a second condition which measures the number of times an end user invokes each feature of the common features 304. When the remaining features of the common features 304 the end user has never invoked and/or used, the present invention may remove the first GUI 100 completely and exposes only the second GUI 200. This situation would also take into account those common features 304 which and end user does not utilize and therefore do not need to display the first GUI 100. After completion of step 408, the method 400 ends 410.

While function and actions between two different applications or interfaces can be integrated and taught to an end user so can the visual display and audio signals. Also sounds of each application may be slowly modified to sound like those of the newer applications and/or GUI.

Figure 5:
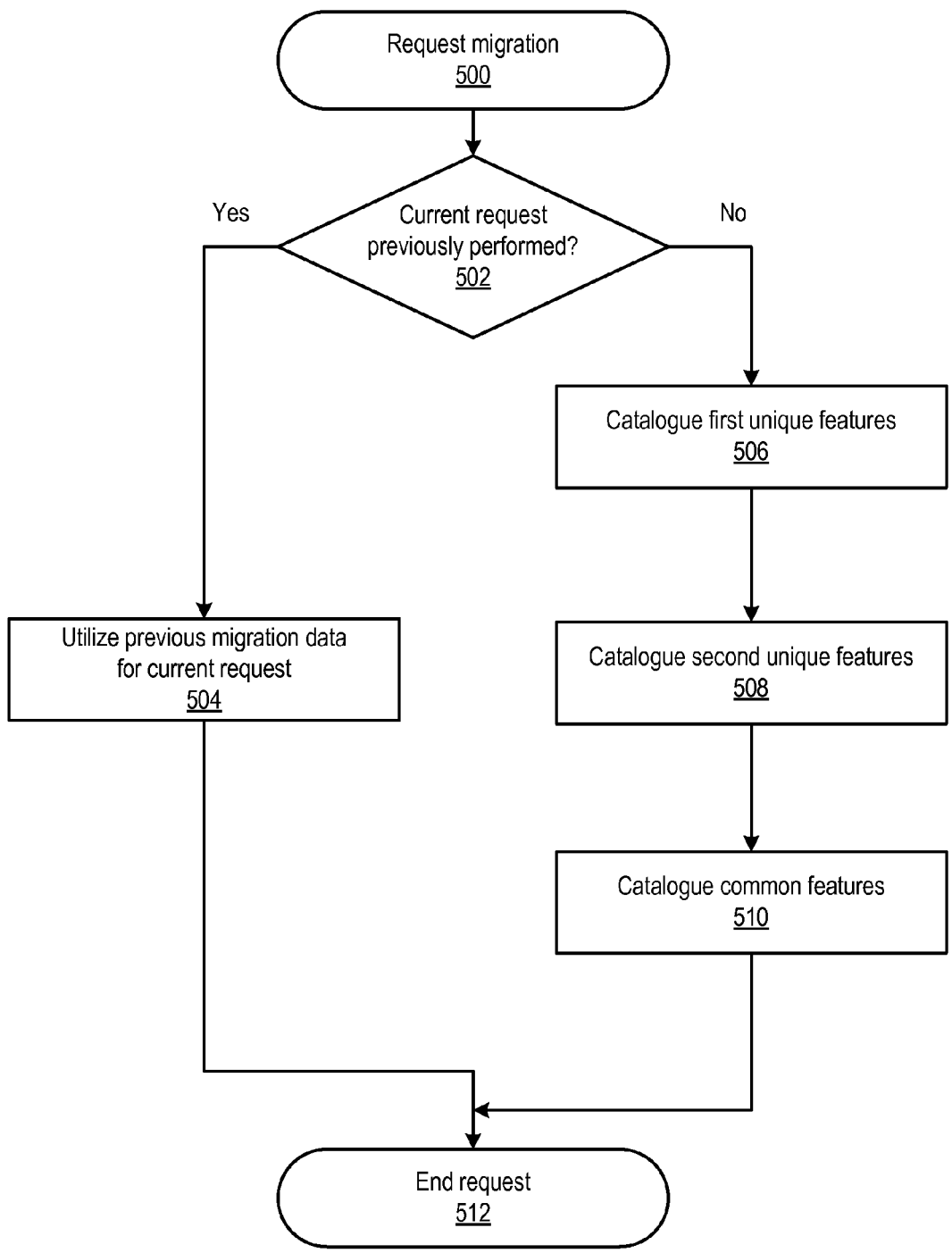
FIG. 5 illustrates a method for cataloging information pertaining to both the first application and second application before the migration method of FIG. 4, in accordance with the embodiments of the present invention.

FIG. 5 illustrates a method 500 for cataloging information pertaining to both the first application and second application before the migration performed by the migration method 400 of FIG. 4, in accordance with the embodiments of the present invention. The method 500 begins with step 502 which determines whether the current requested migration was previously performed.

Step 502 determines whether the current requested migration was previously performed in response to a migration request from an end user. Typically, the end user requests a migration from a familiar application, the first application, to a less familiar application, the second application. For example, an end user who is familiar with AutoCAD® 2.0 requests to have a similar interface adapted to the newer AutoCAD® 3.0. The service and system reconfigures the user's desired application to have an interface that is similar to the application that the user is familiar with. This is accomplished by identifying and matching functions and applications of the desired application with the buttons and commands of the interface of the user's application.

If the current migration request was previously performed and the data stored, the method 500 continues with step 504 which utilizes the previous migration data for the current request. However, if the current request was not previously performed, the method 500 continues with step 506 which catalogues the first unique features 104 from the first GUI 100.

Step 504 utilizes the migration data previously stored for the first application and second application. After completion of step 504, the method ends at step 512.

Step 506 catalogues the first unique features 104 from the first GUI 100. After completion of step 506, the method 500 continues with step 508 which catalogues the second unique features 204 from the second GUI 200.

Step 508 catalogues the second unique features 204 from the second GUI 200. After completion of step 508, the method 500 continues with step 510 which catalogues the common features 304 from both the first GUI 100 and second GUI 200.

Step 510 catalogues the common features 304 from both the first GUI 100 and second GUI 200. After completion of step 510, the method 500 ends at step 512.

The invention further provides a migrating system for migrating from a first application to a second application, the second application being an alternative to the first application with respect to functionality.

Figure 6:
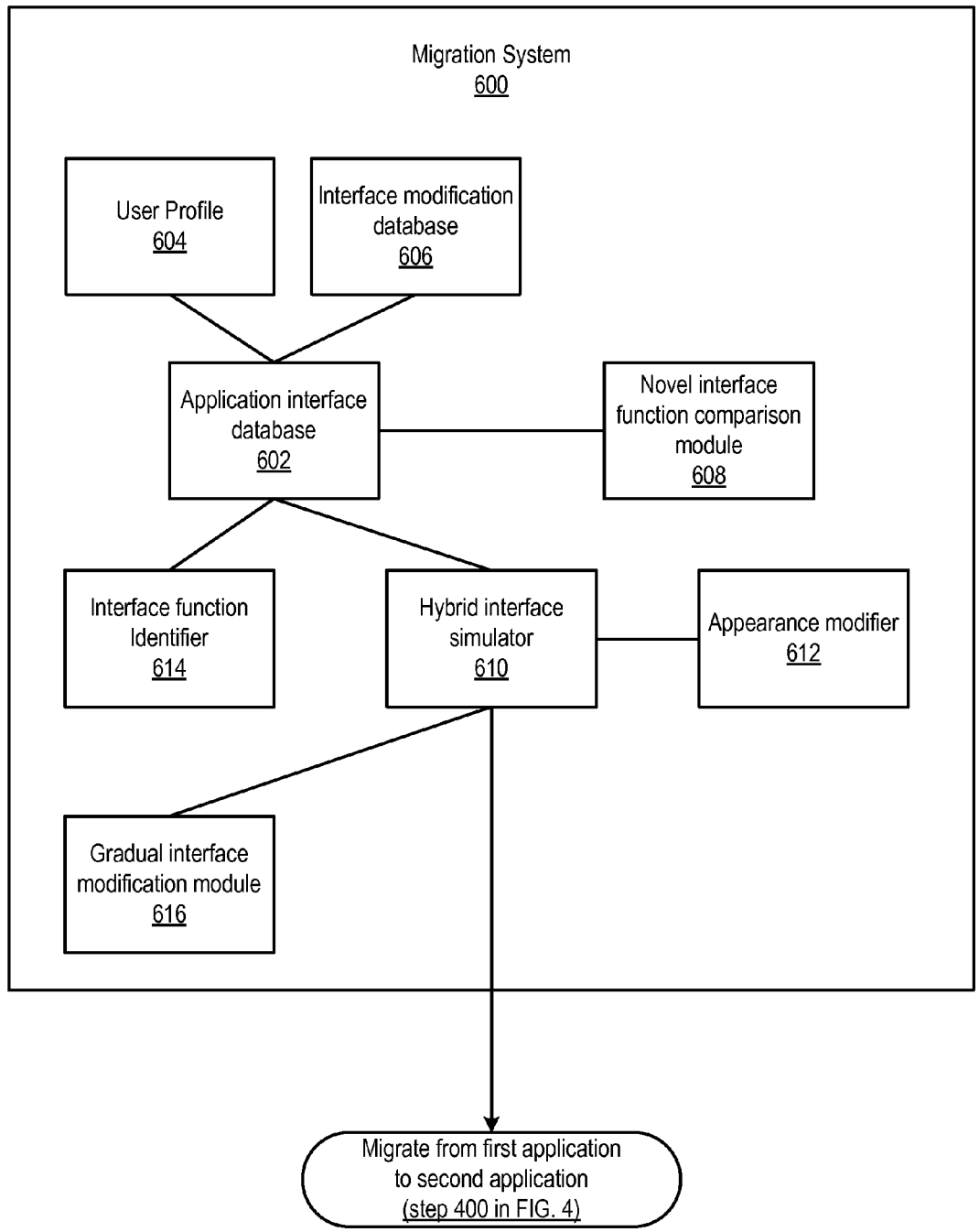
FIG. 6 illustrates a migration system, in accordance with embodiments of the present invention.

A migration system 600, in accordance with embodiments of the present invention, is illustrated in FIG. 6.

In one embodiment of the present invention, the migration system 600 comprises an application database 602, a user profile database 604, an interface modification database 606, a novel interface function comparison module 608, a hybrid interface simulator 610, an appearance modifier 612, an interface function identifier 614, and a gradual interface modification module 616.

The user profile database 604 may contain a record of all the previous application interface modifications created for a given end user. Indeed, the end user may have a preference for modification of certain functions or aspects of an application which is also stored in the profile. For example, an end user switching to Microsoft® Word® from Lotus® Notes® may prefer to have menu tabs and buttons in Word® appear as they do in Lotus Notes®. Other preferences can include: appearance (color and form/shape) and specific function commands (clicking 'print' instead of 'ctl+p'). The user profile database may store a specific end user's preferences for later user. The user profile database may also be used in the case where an end user wishes to re-migrate from a first GUI to a second GUI.

The Interface modification database 606 stores information on previous interface modifications that can be used to quickly modify a new interface. For example, if an embodiment of the present invention was already used to modify an interface from Microsoft® Word® to Lotus® Notes® the same modifications can be applied if a different user requests the same modification.

Both the user profile 604 and interface modification database 606 communicate with the application interface database 602. The application interface database 602 stores all current applications and information about their interfaces (appearance and commands). Functions and commands for a novel application interface are entered into the application interface database 602 via the interface function identifier 614.

The novel interface function comparison module 608 is provided to compare an end user's original application with the application he wishes to migrate to. The module 608 identifies differences in appearance and function based on programming code.

The hybrid interface simulator 610 is provided to create a simulated interface that changes all the visual and functional elements of an application the user indicated in their profile. For example, if an end user wishes color schemes, shapes of icons, and certain commands to represent Microsoft® Word®, when using Lotus® Notes®, the hybrid interface simulator 610 creates all of these changes.

The gradual interface modification module 616 is adapted to prevent dramatic modification of an application's interface, allowing an end user to gradually learn a new application. The gradual interface modification module 616 acts on the hybrid interface simulator 610 executing modifications in a hierarchical manner to prevent all changes from occurring at once.

The appearance modifier 612 is provided to change physical, visual elements of an interface so it matches an end user's requirements. The appearance modifier 612 is responsible for converting color schemes and physical shapes so that they are compatible for the end user.

Figure 7:
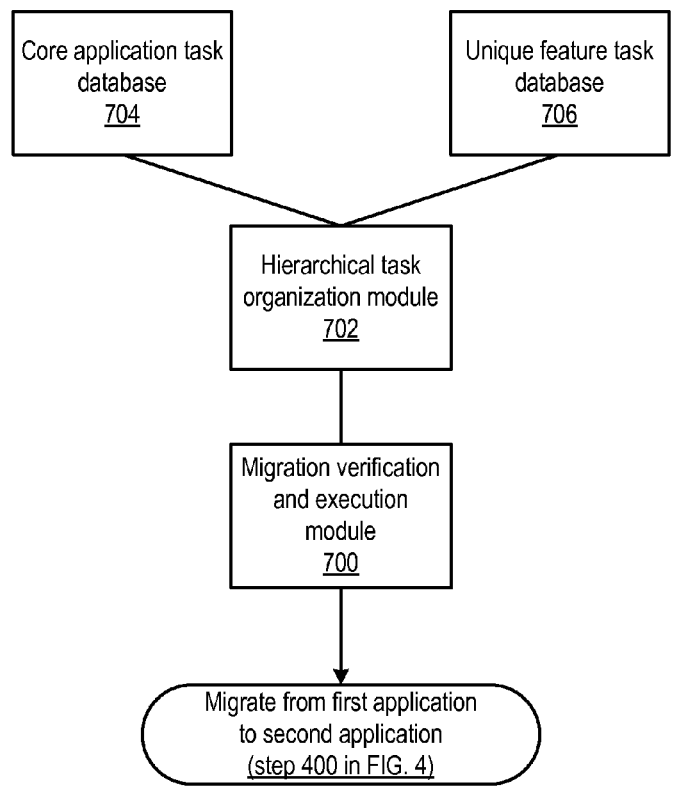
FIG. 7 illustrates a migration and verification module, in accordance with embodiments of the present invention.

The migration system 600 may also include a migration and verification module 700, as depicted in FIG. 7 in accordance with embodiments of the present invention.

The migration and verification module 700 comprises a hierarchical task organization module 702, a core application task database 704, and a unique feature task database 706. The purpose of the module 700 is to ensure the application can perform all the necessary tasks with the new interface, before sending the application back to an end user.

Operations and tasks that can be performed by an application are categorized as core or unique features tasks and stored in their respective databases, 704 or 706. A core task is one that is essential to the main purpose of an application. For example, Microsoft® Word® must retain its "word processing" functions. Unique features of an application are ones that are not shared, or essential for the operation of the program. For example, if Lotus® Notes® 10.0 can perform speech recognition but Lotus® Notes® 8.0 cannot, speech recognition would be stored in the unique features task database.

The tasks of a given program are organized by the hierarchical task organization module 702 into a sequence. The function of an application will be verified by the sequential successful execution of each task organized by the hierarchical task organization module 702. The execution of each task is performed by the adaptation verification and execution module 700. The fate of each task execution and troubleshooting is supervised by the migration method 400 as described in FIG. 4, supra.

Figure 8:
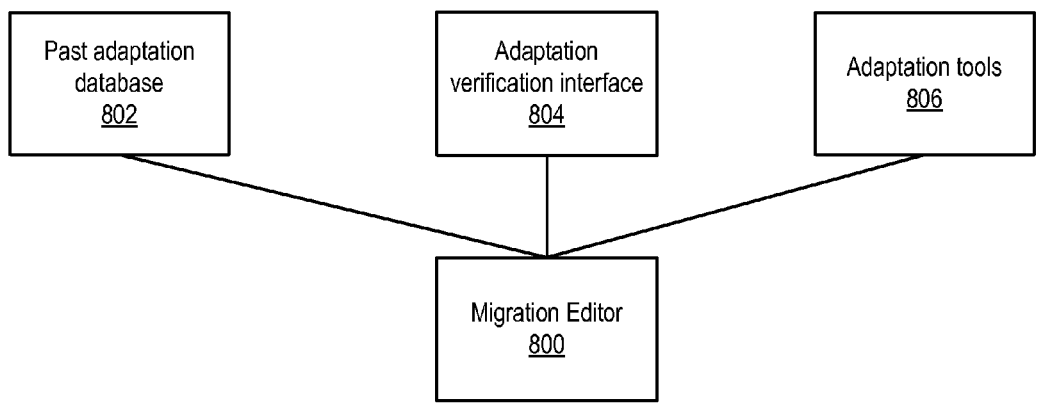
FIG. 8 illustrates a migration editor, in accordance with embodiments of the preset invention.

The migration system 600 may further include an adaptation editor 800 as illustrated in FIG. 8.

The adaptation editor 800 comprises a past adaptation database 802, an adaptation verification interface 804, and adaptation tools 806. The adaptation editor 800 receives an application adaptation request from a user (see request migration 500 in FIG. 5, supra). The editor 800 can search the past adaptation database 802 for similar adaptations that have already been executed. The adaptation verification interface 804 links to the adaptation verification and execution module 700 (see FIG. 7, supra). The adaptation editor 800 sends the application to an end user once it is complete. The adaptation tools 806 allows for changes to be made to the appearance (color, shapes, and ordering) and function of elements of an application. An end user can utilize the adaptation tools 806 to customize a migration to their specific look and feel. The adaptation editor 800 can also track and update an application based on preferences of an end user.

Figure 9:
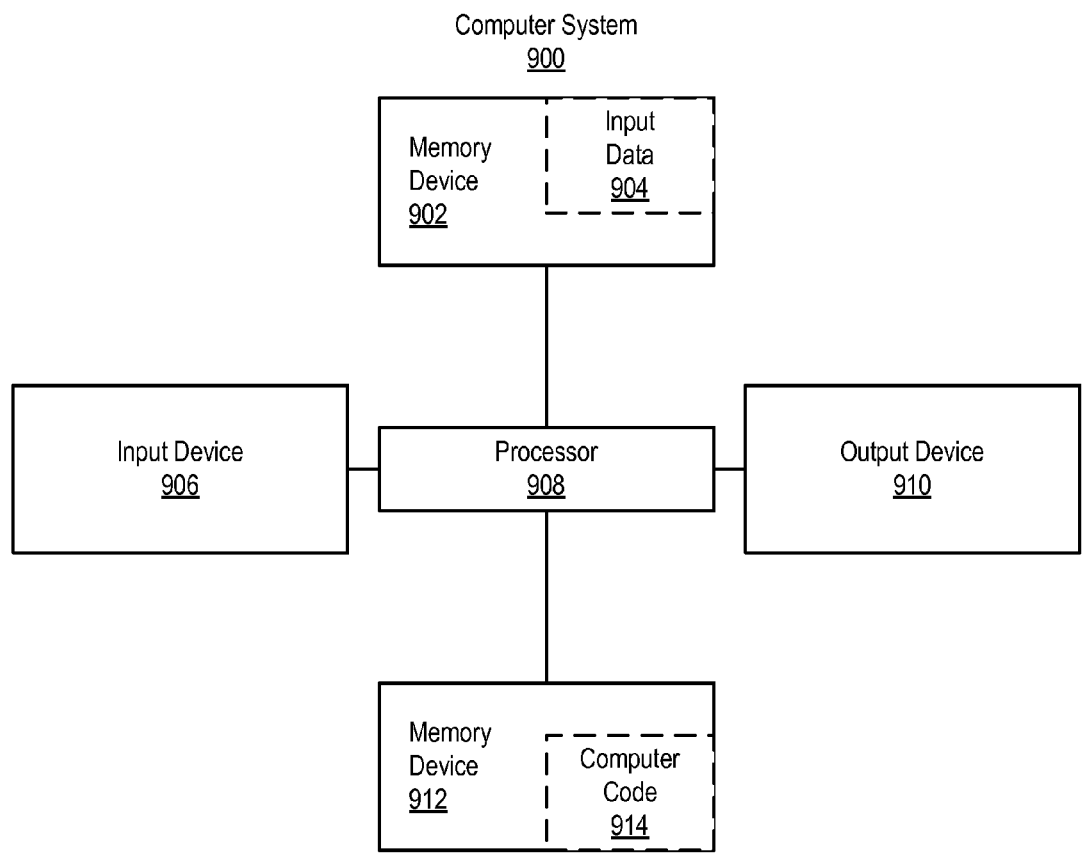
FIG. 9 illustrates a computer system used for migrating from a first application to a second application wherein the second application is an alternative to the first application with respect to functionality, in accordance with the embodiments of the present invention.

The invention also provides a computer system 900, as illustrated in FIG. 9, used for migrating from a first application to a second application wherein the second application is an alternative to the first application with respect to functionality, in accordance with the embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for migrating from a first application to a second application wherein the second application is an alternative to the first application with respect to functionality. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 9) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for migrating from a first application to a second application wherein the second application is an alternative to the first application with respect to functionality. Thus, the present invention discloses a process for supporting computer infrastructure, comprising integrating, hosting, maintaining and deploying computer-readable code into a computing system (e.g., computing system 900), wherein the code in combination with the computing system is capable of performing a method for migrating from a first application to a second application wherein the second application is an alternative to the first application with respect to functionality.

In another embodiment, the invention provides a business method that performs the process steps of the invention on a subscription, advertising, and/or fee basis. That is, a service provider, such as a Solution Integrator, can offer to create, maintain, support, etc. a process for identifying entities according to the plausibility that their data values contain outliers of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 9 shows the computer system 900 as a particular configuration of hardware and software, any configuration of hardware and software, as would be known to a person of ordinary skill in the art, may be utilized for the purposes stated supra in conjunction with the particular computer system 900 of FIG. 9. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed:

1. A method for migrating from a first application to a second application wherein the second application is an alternative to the first application with respect to functionality, the method comprising:

overlaying, in a display device, a first graphical user interface (GUI) onto the second application, the first GUI corresponding to the first application which generates an overlay interface comprising the first GUI overlaid on a second GUI corresponding to the second application, said overlay interface displaying a plurality of features not comprising first unique features and comprising both second unique features and a plurality of common features, said first unique features appearing on the first GUI and being specific to only the first application, said second unique features appearing on the second GUI and being specific to only the second application, said common features appearing on both the first GUI and the second GUI and used by both the first application and the second application;

responsive to a common feature of the plurality of common features having been selected via the overlay interface after said overlaying, invoking the selected common feature by both implementing the selected common feature by the second application through use of the first GUI and depicting in a suggestion area in the display device a set of steps which if executed would implement the selected common feature by the second application utilizing the second GUI, said suggestion area being spatially separated from the first GUI and the second GUI in the display device;

after said depicting, exposing a portion of the second GUI in the display device by removing the selected common feature from the first GUI to expose the second GUI at a location where the selected common feature has been selectively removed from the first GUI if a first determination has been made that a first condition pertaining to the selected common feature has been satisfied; and after said exposing the portion of the second GUI, removing the first GUI to expose the second GUI in the display device if a second determination has been made that a second condition pertaining to the plurality of common features has been satisfied, else repeating a next iteration of said overlaying, said invoking, said exposing the portion of the second GUI, and said removing the first GUI until said second determination is made, wherein said second determination is made after said repeating has been performed at least once, wherein the first condition is satisfied at least once.

2. The method of claim 1, wherein the first condition is that said invoking has been performed a specified number of times consisting of more than one time for the selected common feature.

3. The method of claim 1, wherein the first condition is an elapse of a first specified amount of time since said invoking was first performed for the selected common feature.

4. The method of claim 1, wherein the second condition is that said invoking has been performed a specified number of times consisting of more than one time for each common feature of the plurality of common features.

5. The method of claim 1, wherein the second condition is an elapse of a second specified amount of time since said invoking was last performed.

6. A computer program product, comprising a computer readable physically tangible storage device having computer-readable program code stored therein, said computer-readable program code containing instructions that when executed by a processor of a computer system implement a method for migrating from a first application to a second application wherein the second application is an alternative to the first application with respect to functionality, the method comprising:

overlaying, in a display device, a first graphical user interface (GUI) onto the second application, the first GUI corresponding to the first application which generates an overlay interface comprising the first GUI overlaid on a second GUI corresponding to the second application, said overlay interface displaying a plurality of features not comprising first unique features and comprising both second unique features and a plurality of common features, said first unique features appearing on the first GUI and being specific to only the first application, said second unique features appearing on the second GUI and being specific to only the second application, said common features appearing on both the first GUI and the second GUI and used by both the first application and the second application;

responsive to a common feature of the plurality of common features having been selected via the overlay interface after said overlaying, invoking the selected common feature by both implementing the selected common feature by the second application through use of the first GUI and depicting in a suggestion area in the display device a set of steps which if executed would implement the selected common feature by the second application utilizing the second GUI, said suggestion area being spatially separated from the first GUI and the second GUI in the display device;

after said depicting, exposing a portion of the second GUI in the display device by removing the selected common feature from the first GUI to expose the second GUI at a location where the selected common feature has been selectively removed from the first GUI if a first determination has been made that a first condition pertaining to the selected common feature has been satisfied; and after said exposing the portion of the second GUI, removing the first GUI to expose the second GUI in the display device if a second determination has been made that a second condition pertaining to the plurality of common features has been satisfied, else repeating a next iteration of said overlaying, said invoking, said exposing the portion of the second GUI, and said removing the first GUI until said second determination is made, wherein said second determination is made after said repeating has been performed at least once, wherein the first condition is satisfied at least once.

7. The computer program product of claim 6, wherein the first condition is that said invoking has been performed a specified number of times consisting of more than one time for the selected common feature.

8. The computer program product of claim 6, wherein the first condition is an elapse of a first specified amount of time since said invoking was first performed for the selected common feature.

9. The computer program product of claim 6, wherein the second condition is that said invoking has been performed a specified number of times consisting of more than one time for each common feature of the plurality of common features.

10. The computer program product of claim 6, wherein the second condition is an elapse of a second specified amount of time since said invoking was last performed.

11. A computing system comprising a processor coupled to a computer-readable memory unit, said memory unit comprising a software application, said software application comprising instruction that when executed by said processor, implement a method for migrating from a first application to a second application wherein the second application is an alternative to the first application with respect to functionality, the method comprising:

overlaying, in a display device, a first graphical user interface (GUI) onto the second application, the first GUI corresponding to the first application which generates an overlay interface comprising the first GUI overlaid on a second GUI corresponding to the second application, said overlay interface displaying a plurality of features not comprising first unique features and comprising both second unique features and a plurality of common features, said first unique features appearing on the first GUI and being specific to only the first application, said second unique features appearing on the second GUI and being specific to only the second application, said common features appearing on both the first GUI and the second GUI and used by both the first application and the second application;

responsive to a common feature of the plurality of common features having been selected via the overlay interface after said overlaying, invoking the selected common feature by both implementing the selected common feature by the second application through use of the first GUI and depicting in a suggestion area in the display device a set of steps which if executed would implement the selected common feature by the second application utilizing the second GUI, said suggestion area being spatially separated from the first GUI and the second GUI in the display device;

after said depicting, exposing a portion of the second GUI in the display device by removing the selected common feature from the first GUI to expose the second GUI at a location where the selected common feature has been selectively removed from the first GUI if a first determination has been made that a first condition pertaining to the selected common feature has been satisfied; and after said exposing the portion of the second GUI, removing the first GUI to expose the second GUI in the display device if a second determination has been made that a second condition pertaining to the plurality of common features has been satisfied, else repeating a next iteration of said overlaying, said invoking, said exposing the portion of the second GUI, and said removing the first GUI until said second determination is made, wherein said second determination is made after said repeating has been performed at least once, wherein the first condition is satisfied at least once.

12. The computing system of claim 11, wherein the first condition is that said invoking has been performed a specified number of times consisting of more than one time for the selected common feature.

13. The computing system of claim 11, wherein the first condition is an elapse of a first specified amount of time since said invoking was first performed for the selected common feature.

14. The computing system of claim 11, wherein the second condition is that said invoking has been performed a specified number of times consisting of more than one time for each common feature of the plurality of common features.

15. The computing system of claim 11, wherein the second condition is an elapse of a second specified amount of time since said invoking was last performed.

16. A process for supporting computer infrastructure, said process comprising providing at least one support service for at least one of creating, integrating, hosting, maintaining, and deploying computer-readable code in a computing system, wherein said code in combination with the computing system is capable of implementing a method for migrating from a first application to a second application wherein the second application is an alternative to the first application with respect to functionality, the method comprising:

overlaying, in a display device, a first graphical user interface (GUI) onto the second application, the first GUI corresponding to the first application which generates an overlay interface comprising the first GUI overlaid on a second GUI corresponding to the second application, said overlay interface displaying a plurality of features not comprising first unique features and comprising both second unique features and a plurality of common features, said first unique features appearing on the first GUI and being specific to only the first application, said second unique features appearing on the second GUI and being specific to only the second application, said common features appearing on both the first GUI and the second GUI and used by both the first application and the second application;

responsive to a common feature of the plurality of common features having been selected via the overlay interface after said overlaying, invoking the selected common feature by both implementing the selected common feature by the second application through use of the first GUI and depicting in a suggestion area in the display device a set of steps which if executed would implement the selected common feature by the second application utilizing the second GUI, said suggestion area being spatially separated from the first GUI and the second GUI in the display device;

after said depicting, exposing a portion of the second GUI in the display device by removing the selected common feature from the first GUI to expose the second GUI at a location where the selected common feature has been selectively removed from the first GUI if a first determination has been made that a first condition pertaining to the selected common feature has been satisfied; and after said exposing the portion of the second GUI, removing the first GUI to expose the second GUI in the display device if a second determination has been made that a second condition pertaining to the plurality of common features has been satisfied, else repeating a next iteration of said overlaying, said invoking, said exposing the portion of the second GUI, and said removing the first GUI until said second determination is made, wherein said second determination is made after said repeating has been performed at least once, wherein the first condition is satisfied at least once.

17. The process of claim 16, wherein the first condition is that said invoking has been performed a specified number of times consisting of more than one time for the selected common feature.

18. The process of claim 16, wherein the first condition is an elapse of a first specified amount of time since said invoking was first performed for the selected common feature.

19. The process of claim 16, wherein the second condition is that said invoking has been performed a specified number of times consisting of more than one time for each common feature of the plurality of common features.

20. The process of claim 16, wherein the second condition is an elapse of a second specified amount of time since said invoking was last performed.

* * * * *